United States Patent
Abu Rabeah et al.

(10) Patent No.: US 12,195,409 B2
(45) Date of Patent: *Jan. 14, 2025

(54) COMPACTED POLYHALITE AND A PROCESS FOR THE PRODUCTION THEREOF

(71) Applicant: ICL EUROPE COOPERATIEF U.A., Amsterdam (NL)

(72) Inventors: Khalil Abu Rabeah, Beer-sheba (IL); Natalia Geinik, Arad (IL); Ruben Socolovsky, Beer Sheva (IL); Yacov Levy, Dimona (IL); Marina Dakov, Arad (IL)

(73) Assignee: ICL EUROPE COOPERATIEF U.A., Amsterdam (NL)

( * ) Notice: Subject to any disclaimer, the term of this patent is extended or adjusted under 35 U.S.C. 154(b) by 906 days.

This patent is subject to a terminal disclaimer.

(21) Appl. No.: 17/292,865

(22) PCT Filed: Nov. 22, 2019

(86) PCT No.: PCT/IL2019/051278
§ 371 (c)(1),
(2) Date: May 11, 2021

(87) PCT Pub. No.: WO2020/105055
PCT Pub. Date: May 28, 2020

(65) Prior Publication Data
US 2021/0395158 A1  Dec. 23, 2021

Related U.S. Application Data

(60) Provisional application No. 62/770,886, filed on Nov. 23, 2018.

(51) Int. Cl.
*C05D 1/00* (2006.01)
*B01J 2/28* (2006.01)
(Continued)

(52) U.S. Cl.
CPC ............ *C05D 1/005* (2013.01); *B01J 2/28* (2013.01); *C05D 1/02* (2013.01); *C05G 5/12* (2020.02); *B02C 23/12* (2013.01)

(58) Field of Classification Search
CPC ............ C05D 1/005; C05D 1/02; C05G 5/12; B01J 2/28
See application file for complete search history.

(56) References Cited

U.S. PATENT DOCUMENTS 2,136,996 A  11/1938 Wiedbrauck
2,138,827 A  12/1938 Bailey
(Continued)

FOREIGN PATENT DOCUMENTS

BR  102012031210  1/2015
CA  2963011 A1 * 4/2016  ............... C05G 3/00
(Continued)

OTHER PUBLICATIONS

ARIPO Search Report for App. No. AP/P/2019/011816, dated Nov. 14, 2021, 1 page.
(Continued)

*Primary Examiner* — Wayne A Langel
(74) *Attorney, Agent, or Firm* — AlphaPatent Associates Ltd.; Daniel J. Swirsky (57) ABSTRACT

There is provided herein a process for the compaction of Polyhalite, comprising: mixing a feed of polyhalite with an inorganic binder in a mixer to yield a mixture; compacting said mixture in a compactor to yield masses; crushing said masses in a crusher to yield particles; and screening said particles in a screener to yield particles in three different sizes: oversized fine particles which undergo a second crushing process and are retuned to said screener for screening, undersized fine particles which are transferred to said mixer for further mixing and compacting, and desired size (Continued)

fine particles which are transferred to a polish screener for glazing and oiling.

13 Claims, 2 Drawing Sheets

(51) Int. Cl.
   *C05D 1/02*     (2006.01)
   *C05G 5/12*     (2020.01)
   *B02C 23/12*    (2006.01)

(56) References Cited

U.S. PATENT DOCUMENTS

| | | |
|---|---|---|
| 2,997,171 A | 8/1961 | Samsel |
| 3,043,652 A | 7/1962 | Schytil |
| 3,332,470 A | 7/1967 | Chirico |
| 3,332,827 A | 7/1967 | Griffith |
| 3,532,621 A | 10/1970 | Hough |
| 3,548,046 A | 12/1970 | Savage |
| 3,711,254 A | 1/1973 | McGowan |
| 3,876,387 A | 4/1975 | Coulson |
| 3,877,920 A | 4/1975 | Carlberg |
| 4,068,718 A | 1/1978 | Cooke, Jr. |
| 4,129,642 A | 12/1978 | Neitzel |
| 4,283,423 A | 8/1981 | Watkins |
| 4,385,920 A | 5/1983 | Dancy |
| 4,427,068 A | 1/1984 | Fitzgibbon |
| 4,963,231 A | 10/1990 | Ryham |
| 5,112,379 A | 5/1992 | Young |
| 5,174,804 A | 12/1992 | Rehberg |
| 5,383,952 A | 1/1995 | Singewald |
| 5,651,888 A | 7/1997 | Shimizu |
| 6,284,278 B1 | 9/2001 | Waldman |
| 6,287,496 B1 | 9/2001 | Lownds |
| 6,454,979 B1 | 9/2002 | Phinney |
| 9,266,784 B2 | 2/2016 | Ferguson |
| 9,592,514 B2 | 3/2017 | Kaps |
| 10,934,225 B2 * | 3/2021 | Socolovsky ............ C05G 5/12 |
| 2002/0109736 A1 | 8/2002 | Chailleux |
| 2002/0121117 A1 | 9/2002 | Hartmann |
| 2004/0139992 A1 | 7/2004 | Murkute |
| 2005/0072724 A1 | 4/2005 | Nakayama |
| 2005/0276905 A1 | 12/2005 | Xing |
| 2006/0003893 A1 | 1/2006 | Pursell |
| 2006/0144789 A1 | 7/2006 | Cath |
| 2006/0148646 A1 | 7/2006 | Pursell |
| 2008/0223098 A1 | 9/2008 | Taulbee |
| 2009/0261040 A1 | 10/2009 | Pruet |
| 2009/0272692 A1 | 11/2009 | Kurth |
| 2010/0213129 A1 | 8/2010 | Jones |
| 2010/0224476 A1 | 9/2010 | Cath |
| 2011/0017666 A1 | 1/2011 | Cath |
| 2011/0064853 A1 | 3/2011 | Maeki |
| 2011/0123420 A1 | 5/2011 | Phinney |
| 2011/0218102 A1 | 9/2011 | Anderson |
| 2011/0257788 A1 | 10/2011 | Wiemers |
| 2011/0315632 A1 | 12/2011 | Freije, III |
| 2013/0001162 A1 | 1/2013 | Yangali-Quintanilla |
| 2013/0233797 A1 | 9/2013 | Cath |
| 2013/0264260 A1 | 10/2013 | Heinzl |
| 2014/0001122 A1 | 1/2014 | Schultz |
| 2014/0175011 A1 | 6/2014 | Benton |
| 2014/0223979 A1 | 8/2014 | Wiseman |
| 2014/0245803 A1 | 9/2014 | Forsythe |
| 2014/0260467 A1 | 9/2014 | Peacock |
| 2015/0014232 A1 | 1/2015 | McGinnis |
| 2015/0101987 A1 | 4/2015 | Yeh |
| 2016/0060182 A1 | 3/2016 | Cook |
| 2017/0121233 A1 | 5/2017 | Meakin |
| 2017/0129822 A1 | 5/2017 | Farnworth |
| 2017/0129823 A1 | 5/2017 | Kaps |
| 2017/0305805 A1 | 10/2017 | Farnworth |
| 2018/0086675 A1 | 3/2018 | Burchard |
| 2018/0179117 A1 | 6/2018 | Socolovsky |
| 2018/0297903 A1 | 10/2018 | Ledoux |
| 2018/0327328 A1 | 11/2018 | Meakin |

FOREIGN PATENT DOCUMENTS

| | | | |
|---|---|---|---|
| CA | 2963014 A1 * | 4/2016 | ............ C05D 1/02 |
| CN | 1032116 A | 4/1989 | |
| CN | 1076435 A | 9/1993 | |
| CN | 1083800 | 3/1994 | |
| CN | 1091990 A | 9/1994 | |
| CN | 1093695 A | 10/1994 | |
| CN | 1236765 A | 12/1999 | |
| CN | 1297371 A | 5/2001 | |
| CN | 1314308 A | 9/2001 | |
| CN | 1387497 | 12/2002 | |
| CN | 1407957 A | 4/2003 | |
| CN | 1485124 | 3/2004 | |
| CN | 1548371 A | 11/2004 | |
| CN | 1690023 A | 11/2005 | |
| CN | 1715258 A | 1/2006 | |
| CN | 1793064 A | 6/2006 | |
| CN | 1997721 A | 7/2007 | |
| CN | 101608168 | 12/2009 | |
| CN | 101772377 A | 7/2010 | |
| CN | 101792334 A | 8/2010 | |
| CN | 101844949 A | 9/2010 | |
| CN | 101993270 A | 3/2011 | |
| CN | 101993317 A | 3/2011 | |
| CN | 102001899 A | 4/2011 | |
| CN | 102249766 | 11/2011 | |
| CN | 102304003 A | 1/2012 | |
| CN | 102464500 | 5/2012 | |
| CN | 102464508 | 5/2012 | |
| CN | 103011958 A | 4/2013 | |
| CN | 103613464 A | 3/2014 | |
| CN | 103688788 A | 4/2014 | |
| CN | 103930387 A | 7/2014 | |
| CN | 104016379 A | 9/2014 | |
| CN | 104211545 | 12/2014 | |
| CN | 104341228 | 2/2015 | |
| CN | 104355778 | 2/2015 | |
| CN | 104609967 A | 5/2015 | |
| CN | 105130645 A | 12/2015 | |
| CN | 105263614 A | 1/2016 | |
| CN | 105347983 | 2/2016 | |
| CN | 106082279 A | 11/2016 | |
| CN | 104355778 B | 2/2017 | |
| CN | 106495811 A | 3/2017 | |
| CN | 106536033 A | 3/2017 | |
| CN | 106536035 A | 3/2017 | |
| CN | 106699485 | 5/2017 | |
| CN | 107418586 A | 12/2017 | |
| CN | 107922286 A | 4/2018 | |
| CN | 108367996 A | 8/2018 | |
| CO | 7200058 | 2/2015 | |
| DE | 2408410 A1 | 8/1974 | |
| DE | 102007049182 B3 | 5/2009 | |
| DE | 102009041456 | 3/2011 | |
| DE | 102013004597 A1 | 9/2014 | |
| EP | 0488199 | 6/1992 | |
| EP | 0488199 B1 | 1/1995 | |
| EP | 0835161 | 4/1998 | |
| EP | 0918045 A1 | 5/1999 | |
| EP | 2840074 | 2/2015 | |
| FR | 2583412 A1 | 12/1986 | |
| GB | 935007 A | 8/1963 | |
| GB | 1378938 | 12/1974 | |
| GB | 2032903 A | 5/1980 | |
| GB | 2514233 A | 11/2014 | |
| GB | 2514776 A | 12/2014 | |
| GB | 2522490 A | 7/2015 | |
| GB | 2522491 A * | 7/2015 | ............ B01J 2/14 |
| GB | 2522492 A | 7/2015 | |
| GB | 2522490 B | 12/2015 | |
| GB | 2530757 A * | 4/2016 | ............ C05G 5/00 |
| GB | 2560026 A * | 8/2018 | ............ B07B 13/04 |
| GB | 2577865 A | 4/2020 | |
| JP | H0255397 | 2/1990 | |

(56) References Cited

FOREIGN PATENT DOCUMENTS

| | | |
|---|---|---|
| JP | 2003112017 | 4/2003 |
| JP | 2004182549 | 7/2004 |
| JP | 3816870 | 8/2006 |
| KR | 101335445 B1 | 12/2013 |
| RU | 2662201 | 7/2018 |
| SU | 695018 A1 | 6/1982 |
| SU | 990756 A1 | 1/1983 |
| SU | 1310337 A1 | 5/1987 |
| SU | 1430388 A1 | 10/1988 |
| SU | 1574542 A1 | 6/1990 |
| WO | 9629287 A1 | 9/1996 |
| WO | 9730782 | 8/1997 |
| WO | 0121556 A1 | 3/2001 |
| WO | 02066402 A1 | 8/2002 |
| WO | 2006096825 | 9/2006 |
| WO | 2007071175 | 6/2007 |
| WO | 2007073207 A1 | 6/2007 |
| WO | 2009086587 A1 | 7/2009 |
| WO | 2011053794 A2 | 5/2011 |
| WO | 2012109723 A1 | 8/2012 |
| WO | 2012115496 A1 | 8/2012 |
| WO | 2013055219 A1 | 4/2013 |
| WO | 2014026048 A2 | 2/2014 |
| WO | 2014181149 A2 | 11/2014 |
| WO | 2015185907 A1 | 12/2015 |
| WO | 2015185909 A1 | 12/2015 |
| WO | 2016051130 A1 | 4/2016 |
| WO | 2016178211 | 11/2016 |
| WO | 2018073815 | 4/2018 |
| WO | 2018109773 | 6/2018 |
| WO | 2018146684 | 8/2018 |
| WO | 2018154338 | 8/2018 |
| WO | 2018229757 A1 | 12/2018 |

OTHER PUBLICATIONS

Chinese Office Action (with English translation) for App. No. CN201780065167.8, dated Jan. 6, 2022, 8 pages.
Chinese Office Action (with English translation) for App. No. CN201880089257.5, dated Dec. 24, 2021, 16 pages.
Chinese Office Action (with English translation) for App. No. CN201980021914.7, dated Jan. 6, 2022, 10 pages.
European Patent Office Communication pursuant to Article 94(3) EPC for App. No. EP17801109.4, dated Dec. 1, 2021, 2 pages.
Examination Report for App. No. GB1909749.2, dated Jan. 10, 2022, 2 pages.
Office Action (Notice of Allowance and Fees Due (PTOL-85)) dated Jan. 24, 2022 for U.S. Appl. No. 16/468,380 (pp. 1-5).
Office Action (Notice of Allowance and Fees Due (PTOL-85)) dated Feb. 9, 2022 for U.S. Appl. No. 16/468,380 (pp. 1-2).
Hu Yinping, "Power Station Boiler Handbook", Beijing: China Electric Power Press, dated Apr. 30, 2005.
Office Action (including English translation) issued in IL Patent App. No. IL283118, dated Dec. 28, 2023, 7 pages.
Office Action (Final Rejection) dated Feb. 6, 2024 for U.S. Appl. No. 16/969,994 (pp. 1-5).
ICL. "ICLPotashpluS" Advanced Crop Nutrition Brand Leaflet. <https://multisite-assets.icl-growingsolutions.com/wp-content/uploads /2022/01/07083111/ICLPotashplus_brand_leaflet_ENG.pd; Jan. 2022 (Year: 2022).
Office Action (Final Rejection) dated Feb. 20, 2024 for U.S. Appl. No. 16/630,436 (pp. 1-10).
Office Action (Notice of Allowance and Fees Due (PTOL-85)) dated Mar. 4, 2024 for U.S. Appl. No. 16/969,994 (pp. 1-5).
Office Action (Non-Final Rejection) dated Jan. 20, 2023 for U.S. Appl. No. 16/630,436 (pp. 1-6).
Israel Office Action (including English translation) issued in App. No. IL276686, dated Feb. 23, 2023, 4 pages.
European Patent Office Communication pursuant to Article 94(3) EPC issued in App. No. EP18907827, dated Feb. 13, 2023, 5 pages.
European Patent Office Communication pursuant to Article 94(3) EPC issued in App. No. EP18834743, dated Mar. 31, 2023, 6 pages.
Brazilian Office Action (including English translation) issued in App. No. BR112020015159, dated Apr. 17, 2023, 8 pages.
Office Action (Final Rejection) dated Jul. 19, 2022 for U.S. Appl. No. 16/630,436 (pp. 1-12).
Power Station Boiler Handbook, 4 pages. 胡荫平, 《电站锅炉手册》, 北京: 中国电力出版社, (Apr. 30, 2005).
European Patent Office Communication pursuant to Article 94(3) EPC issued in App. No. EP18834743, dated Sep. 16, 2022, 4 pages.
European Patent Office Communication pursuant to Rules 70(2) and 70a(2) EPC issued in App. No. EP19886999, dated Aug. 9, 2022, 1 page.
Brazilian Office Action (including English translation) issued in App. No. BR112020015159, dated Sep. 9, 2022, 8 pages.
TESS Trademark Electronic Search System, "ICL PotashpluS" filing date Aug. 29, 2018 (Year: 2018).
ICL "Safety data sheet: PotashpluS" Printing Date Jul. 24, 2016 v.1 (Year: 2016).
ICL "Product Specification ICL Potashplus 37%" Ref: QD0041 Feb. 15, 2017 (Year: 2017).
Office Action (Non-Final Rejection) dated Sep. 20, 2022 for U.S. Appl. No. 17/054,230 (pp. 1-6).
Brazilian Office Action issued in App. No. BR1120190157492, dated Sep. 17, 2022, 4 pages.
Indian Office Action issued in App. No. IN202127025255, dated Sep. 15, 2022, 5 pages.
Canadian Office Action issued in App. No. CA3069913, dated May 23, 2023, 3 pages.
Everris. "ICL Potashplus 0-0-37" <https://www.everris.com/products/specialty_agriculture/icl-potashplus-icl-potashplus/>(obtained 2023) (Year: 2023).
Office Action (Final Rejection) dated Jul. 27, 2023 for U.S. Appl. No. 16/630,436 (pp. 1-7).
Skydanenko, Maksym, et al. "Reduction of dust emission by monodisperse system technology for ammonium nitrate manufacturing." Processes 5.3 (2017): 37. (Year: 2017).
Beisembaeva, L., et al. "Texhonorna docoporanca B ." Chemical Bulletin of Kazakh National University 64.4 (2011): 42-45. (Year: 2011).
Office Action (Non-Final Rejection) dated Oct. 18, 2023 for U.S. Appl. No. 16/630,436 (pp. 1-9).
Albadarin, Ahmad B. et al., "Granulated polyhalite fertilizer caking propensity", Powder Technology, vol. 308, (Dec. 8, 2016), pp. 193-199, URL: https://doi.org/10.1016/j.powtec.2016.12.004, XP029890407.
Chinese Office Action (with English translation) for App. No. CN201880047533.1, dated Aug. 24, 2021, 10 pages.
Corrected Notice of Allowability dated Oct. 8, 2021 for U.S. Appl. No. 16/468,380 (pp. 1-4).
English version of Chinese Office Action for App. No. CN2017800029016, dated Nov. 16, 2021, 12 pages.
Notice of Allowance dated Oct. 1, 2021 for U.S. Appl. No. 16/468,380 (pp. 1-5).
Satisha, G.C, "Bioefficacy of Polyhalite Application on Yield and Quality of Cabbage and Cauliflower // Polyhalite Application Improves Tea (Camillia sinensis) Yield and Quality in Vietnam", Compendium of Polysulphate scientific research, P.O.Box 75, Beer-Sheva 8410001, Israel, (Dec. 31, 2016), pp. 43-61, URL: http://www.polysulphate.com/uploads/Documents/polysulphate-scientific-compendium.pdf, XP009517838.
AU Examination Report dated Dec. 15, 2021 for Application No. 2017377149, 4 pages.
Extended European Search Report for App. No. EP18834743.9, dated Mar. 18, 2021, 8 pages.
Office Action (Non-Final Rejection) dated Apr. 8, 2022 for U.S. Appl. No. 16/630,436 (pp. 1-9).
European Patent Office Communication pursuant to Article 94(3) EPC issued in App. No. EP16789406.2, mailing date Apr. 11, 2022, 6 pages.
Chinese Office Action (including English translation) issued in App. No. CN201880089257.5, dated Mar. 31, 2022, 13 pages.

(56) References Cited

OTHER PUBLICATIONS

International Potash Institute, 1st IPI Symposium on Polyhalite, Oct. 31, 2017 (Year: 2016).
Sirius Minerals PLC, Polyhalite Product "POLY4" Characterisation Tests (Year: 2013).
Mississippi State University, Soil pH and Fertilizer, Information Sheer 372 (Year: 2015).
John Fulton Physical Properties of Granular Fertilizer and Impact on Spreading, Jul. 28, 2016 (Year: 2016).
Office Action dated May 16, 2022 for U.S. Appl. No. 17/054,230 (pp. 1-15).
Chinese Office Action (with English translation) issued in App. No. CN201980077181.9, dated Apr. 15, 2022, 14 pages.
Brazilian Office Action (including English translation) issued in App. No. BR1120190157492, dated Apr. 27, 2022, 8 pages.
"Potash", Chemical Economics Handbook (CEH) | IHS Markit, (Jul. 2018), URL: https://ihsmarkit.com/products/potash-chemical-economics-handbook.html, XP055809577.
"Potash", Wikipedia, (May 1, 2021), URL: https://en.wikipedia.org/w/index.php?title=Potash&oldid=1020843242, XP055809575.
Yara Fertilizer Industry Handbook, (20181000), pp. 1-97, URL: https://www.yara.com/siteassets/investors/057-reports-and-presentations/other/2018/fertilizer-industry-handbook-2018-with-notes.pdf/, XP055809580.
FAO of the United Nations, "World Fertilizer trends and outlook to 2020", Summary report, (2017), XP055809583.
"Potash", URL: https://www.cargohandbook.com/Potash.
Extended European Search Report issued in App. No. EP19886999, dated Jul. 22, 2022, 7 pages.
Israel Office Action (including English translation) issued in App. No. IL271481, dated Nov. 21, 2022, 4 pages.
Chinese Office Action (with English translation) issued in App. No. CN201980077181.9, dated Nov. 11, 2022, 8 pages.
Chinese Office Action (including English translation) issued in App. No. CN201880089257.5, dated Nov. 14, 2022, 12 pages.
Eurasian Office Action (including English translation) issued in App. No. EA202091794, dated Dec. 23, 2022, 7 pages.
Office Action (Non-Final Rejection) dated Aug. 29, 2023 for U.S. Appl. No. 16/969,994 (pp. 1-7).
"Compendium of Polysulphate scientific research", Potash House, P.O. Box 75, Beer-Sheva 8410001, Israel, www.polysulphate.com (Dec. 31, 2016) 88 pages.
ARIPO Search Report for App. No. AP/P/2019/011816, dated May 25, 2021, 4 pages.
Bichara et al, FR 2583412, English Translation (Year: 1986) 3 pages.
Brazilian Office Action (with English translation) for App. No. BR112019008082-1, dated Jul. 12, 2021, 8 pages.
Brazilian Office Action for App. No. BR112018007847-6, dated Apr. 22, 2021, 4 pages.
Bryan D. Coday et al., "The sweet spot of forward osmosis: Treatment of produced water, drilling wastewater, and other complex and difficult liquid streams", Desalination 333 (2014) 23-35.
Canadian Office Action dated Jul. 12, 2018 for corresponding CA Patent App. No. 2,890,360, 5 pages.
Chile Office Action (with English translation) for App. No. CL02247-2019, dated Jan. 7, 2021, 16 pages.
Chinese Office Action (with English translation) for App. No. CN2017800029016, dated Mar. 16, 2021, 28 pages.
Chinese Office Action (with English translation) for App. No. CN201780065167.8, dated May 28, 2021, 15 pages.
Chinese Office Action (with English translation) in App. No. CN201780084381.8, dated Jul. 16, 2021, 11 pages.
Colombian Office Action for App. No. NC2019/0009684, dated Jun. 24, 2021, 6 pages.
Colombian Search Report for App. No. NC2019/0015080, dated Jun. 24, 2021, 7 pages.
Corrected Notice of Allowability dated Dec. 21, 2020 for U.S. Appl. No. 16/481,183 (pp. 1-2).
Corrected Notice of Allowability dated Feb. 19, 2021 for U.S. Appl. No. 16/343,900 (pp. 1-2).
Database WPI, Week 198346 Thomson Scientific, London, GB; AN 1983-819450, XP002801001, & SU 990 756 A (Kaluga Khlorvinil) Jan. 23, 1983 (Jan. 23, 1983) (1 page).
English version of Chinese Office Action for App. No. CN2018800081429, dated May 24, 2021, 4 pages.
Extended European Search Report for App. No. EP18751114.2, dated Nov. 20, 2020, 8 pages.
Extended European Search Report for App. No. EP18817032.8, dated Feb. 25, 2021, 7 pages.
Extended European Search Report for Application No. 16789406.2 dated Dec. 14, 2018, 8 pages.
Gao et al., CN 106082279, English Translation (Year: 2016) 6 pages.
Indian Examination Report dated Jun. 28, 2018 for IN Application No. 829DELNP2015, 6 pages.
Indian Office Action for App. No. IN201927054628, dated Jun. 11, 2021, 6 pages.
Indonesian Office Action (with English translation) for App. No. P00202000013, dated Jul. 23, 2021, 7 pages.
Indonesian Patent Office Action for App. No. PID201906345, dated Apr. 1, 2021, 4 pages.
International Search Report and Written Opinion mailed Dec. 19, 2013 for corresponding International Patent Application No. PCT/US2013/049166. 7 pages.
Mu Changrong, et al., "Production and Application Technology of Compound Fertilizer", Chengdu University of Science and Technology Press, Dec. 1994, 1st edition, p. 131, 4 pages.
Notice of Allowance dated Jan. 26, 2021 for U.S. Appl. No. 16/343,900 (pp. 1-5).
Notice of Allowance dated Sep. 16, 2020 for U.S. Appl. No. 16/481,183 (pp. 1-9).
Office Action data May 19, 2020 for U.S. Appl. No. 16/343,900 (pp. 1-6).
Office Action dated Apr. 7, 2020, for U.S. Appl. No. 16/343,900 (pp. 1-7).
Office Action dated Aug. 25, 2020 for U.S. Appl. No. 16/343,900 (pp. 1-5).
Office Action dated Aug. 4, 2020 for U.S. Appl. No. 15/570,753 (pp. 1-13).
Office Action dated Feb. 11, 2020, for U.S. Appl. No. 15/570,753 (pp. 1-9).
Office Action dated Jan. 12, 2021 for U.S. Appl. No. 16/343,900 (pp. 1-4).
Office Action dated Jul. 3, 2018 for U.S. Appl. No. 15/559,424 (pp. 1-9).
Office Action dated Jun. 16, 2021 for U.S. Appl. No. 16/468,380 (pp. 1-11).
Office Action dated May 22, 2020 for U.S. Appl. No. 15/570,753 (pp. 1-11).
Office Action dated Sep. 25, 2020 for U.S. Appl. No. 16/343,900 (pp. 1-4).
Omeman, Z. et al., "Geopolymer cement in concrete: novel sustainable", Cemento-Hormigon, 78(906), 4-19 STNDatabase accession No. 2008:130694 XP002777656, 2 pages.
Powder handling & processing, Compaction In Fertilizer Production, "Compaction-Granulation of Fertilizer. An Economical Process for a la carte Formulations", vol. 11(3), Jul./Sep. 1999 (Sep. 30, 1999) 4 pages.
R. L. Earle., "Chapter 8: Evaporation. Multiple Effect Evaporation", Unit Operations in Food Processing, (Dec. 31, 1983), URL: http://wwwww.nzifst.org.nz/UNITOPERATIONS/EVAPORATION2.HTM, XP055282974, 18 pages.
RU Office Action dated Jul. 31, 2019 for RU Application No. 2017141009 (4 pages).
RU Office Action dated May 15, 2017 for RU Application No. 2015103308 (9 pages).
RU Search Report dated May 5, 2017 for RU Application No. 2015103308 (2 pages).
Russian Search Report for Application No. RU2017141009, dated Jul. 10, 2019, 2 pages.

(56) References Cited

OTHER PUBLICATIONS

Study on the phase change of gypsum in fertilizer salt and the granulation mechanism of compound fertilizer, Huanghua, Master's degree thesis of Shanxi Normal University Aug. 31, 2014, pp. 37-41.
Unit Operations in Food Processing—R. L Earle, 1983, NZIFST, http://www.nzifst.org.nz/unitoperations/evaporation2.htm. 7 pages.
Written Opinion of the International Search Authority for parent PCT application PCT/IL2016/050436, 6 pages.
Written Opinion of the International Search Authority for parent PCT application PCT/IL2017/050358 mailed Jun. 25, 2017, 6 pages.
Written Opinion of the International Search Authority for parent PCT application PCT/IL2014/050278, mailed Sep. 14, 2015. 6 pages.
Wu Yuguang et al., "Guide to the Use of Chemical Fertilizers", China Agriculture Press, Sep. 2000, 1st edition, p. 112, 4 pages.
Xu Jinga, et al., "Series of Books On New Production Technology For Compound Fertilizer and Functional Fertilizer And Application Technology Thereof, Production Process Technology," Chemical Industry Press, first edition, Sep. 2000, p. 84, 5 pages.
Canadian Office Action issued in App. No. CA3069913, dated Mar. 4, 2024, 4 pages.
EPO Communication pursuant to Article 94(3) issued in App. No. EP19886725, dated Jul. 5, 2024, 6 pages.

* cited by examiner

COMPACTED POLYHALITE AND A PROCESS FOR THE PRODUCTION THEREOF

FIELD OF THE INVENTION

The present invention relates to the field of fertilizers, specifically to production of compacted Polyhalite.

BACKGROUND OF THE INVENTION

To grow properly, plants need nutrients (nitrogen, potassium, calcium, zinc, magnesium, iron, manganese, etc.) which normally can be found in the soil. Sometimes fertilizers are needed to achieve a desired plant growth as these can enhance the growth of plants.

This growth of plants is met in two ways, the traditional one being additives that provide nutrients. The second mode by which some fertilizers act is to enhance the effectiveness of the soil by modifying its water retention and aeration. Fertilizers typically provide, in varying proportions, three main macronutrients:

Nitrogen (N): leaf growth;
Phosphorus (P): Development of roots, flowers, seeds, fruit;
Potassium (K): Strong stem growth, movement of water in plants, promotion of flowering and fruiting;
three secondary macronutrients: calcium (Ca), magnesium (Mg), and sulphur (S); micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

The most reliable and effective way to make the availability of nutrients coincide with plant requirements is by controlling their release into the soil solution, using slow release or controlled release fertilizers.

Both slow release fertilizers (SRF) and controlled release fertilizers (CRF) supply nutrients gradually. Yet, slow release fertilizers and controlled release fertilizers differ in many ways: The technology they use, the release mechanism, longevity, release controlling factors and more. Solid fertilizers include granules, prills, crystals and powders. A prilled fertilizer is a type of granular fertilizer that is nearly spherical made by solidifying free-falling droplets in air or a fluid medium. Most controlled release fertilizers (CRFs) used in commercial nurseries are prilled fertilizers that have been coated with sulfur or a polymer. These products have been developed to allow a slow release of nutrients into the root zone throughout crop development.

Polyhalite is an evaporite mineral, a hydrated sulfate of potassium, calcium and magnesium with formula: $K_2Ca_2Mg(SO_4)_4 \cdot 2H_2O$. Polyhalite is used as a fertilizer since it contains four important nutrients and is low in chloride:

48% $SO_3$ as sulfate
14% $K_2O$
6% MgO
17% CaO

SUMMARY OF THE INVENTION

According to some demonstrative embodiments, there is provided herein a process for the compaction of Polyhalite. compacting said mixture in a compactor to yield masses; crushing said masses in a crusher to yield particles; and screening said particles in a screener to yield different particles in three different sizes: oversized particles which undergo a second crushing process and are retuned to said screener for screening, undersized particles which are transferred to said mixer for further mixing, and desired size granular particles which are transferred to a screener.

According to some embodiments, the process may be a wet process including the addition of a binders.

According to some embodiments, the binder may be added to the mixer with said feed of Polyhalite as solid slurry or solution.

According to some embodiments, the binder may be inorganic binders or a mix of inorganic and organic binders selected from the group including, starch, molasses, bentonite, metakaolin, sodium silicate, lignosulfonates, hydrated lime, bitumen, Portland cement, clay, acids (nitric, hydrochloric, phosphoric, sulphuric), cellulose gum, sucrose, water, water glass, cements, Fly Ash, Potassium and Sodium Silicate, MgO, CaO, Geo-polymers, oils and waxes and the like, or a combination thereof.

According to some demonstrative embodiments, the binder is preferably an inorganic binder, including bentonite, metakaolin, sodium silicate, lignosulfonates, cements, Fly Ash, Potassium and Sodium Silicate.

According to some embodiments, the use of inorganic binders is preferable due to the existence of silicate elements which are highly beneficial for the plant.

According to some embodiments, the binder is most preferably a mix of organic and inorganic components According to some embodiments, the process is a dry process wherein said mixture is heated in a heater after being mixed in said mixer.

DETAILED DESCRIPTION OF THE INVENTION

According to some demonstrative embodiments, there is provided a process for the compaction of a polyhalite.

According to some embodiments, the compaction may be a wet or dry compaction.

According to some embodiments, the compaction process may include the addition of a binders.

According to some embodiments, the binder, as referred to herein, may include but not limited to any suitable material or compound that may mechanically and/or chemically hold or draw other materials together to form a cohesive whole, including, for example, a mix of organic and inorganic binders, such as, starch, bentonite, sodium silicate, lignosulfonates, molasses, hydrated lime, bitumen, Portland cement, clay, acids (nitric, hydrochloric, phosphoric, sulphuric), cellulose gum, sucrose, water, water glass, cements, Fly Ash, Potassium and Sodium Silicate, MgO, CaO, metakaolin Geo-polymers, oils and waxes and the like, or a combination thereof.

According to some demonstrative embodiments, the binder is preferably an inorganic binder or a mix of inorganic and organic binders including bentonite, metakaolin, sodium silicate, lignosulfonates, cements, Fly Ash, Potassium and Sodium Silicate.

According to some embodiments, the use of inorganic binders is preferable due to the existence of silicate elements which are highly beneficial for the plant.

According to some embodiments, the binder is most preferably a mix of organic and inorganic components.

According to some demonstrative embodiments, the binder may be added in a concentration ranging between 0.5-20% w/w, According to some demonstrative embodiments, the addition of a binder to the process improves the compaction process, enhances the strength of the resulting granules (also referred to herein as flakes) and diminishes the abrasion of the final product, e.g., when the final resulting product is transported). According to some embodiments, the resulting product may have a low abrasion level.

According to some embodiments, when the compaction is a wet compaction, in addition to the binder, water may be added as well.

According to some embodiments, the compaction may be conducted at high feeding temperatures.

According to some demonstrative embodiments, the dry compaction process may include the following steps:

Mixing Polyhalite, optionally with an organic or inorganic binder like gum guar, starch, polymers geo-polymers acids, metakaolin, or basic additives, and other additives may be added at this stage as well;

The mixture may be heated to a temperature between 20-170° C., preferably 160° C.

Feeding the mixture into a compactor to provide compacted flakes;

Grinding of the flakes;

Sieving of the grinded flakes; and

According to some embodiments, after sieving there are three types of yield:

1. Desired sized flakes—between 9-33 mm thickness, S.G. between 1.9 to 2.2.8 g/cm³. According to some embodiments, the desired size of the flakes (also referred to herein as "particles" or "granules") is between 1-6 mm, most preferably between 1.4-4.75 mm.
2. Oversized (OS) flakes—are returned to the grinding stage, e.g., between 4-20-40% w/w of the total resulting flakes.
3. Undersized (US) flakes—are returned to the mixture for compaction, e.g., between 10 to 70% w/w of the total resulting flakes.

According to some embodiments, in the dry process, optionally a binder may be added in a concentration of between 0.01-7% w/w, preferably between 1-5% w/w, most preferably between 2-4% w/w.

According with some embodiments wetting and drying may be done to smooth the surface of the product, for example 3% water addition and drying at 150 degrees.

According to some embodiments, oil may be added to the resulting granules, e.g., to improve the rheology of the product and diminish dust formation. For example in an amount between 3000-5000 ppm, preferably 3000 ppm. According to some embodiments, any suitable oil may be used, including for example, mineral oil or similar, slack wax or similar, paraffin wax or similar or mixture of them According to some demonstrative embodiments, the process may include unique conditions to enable to effective compaction of Polyhalite, including high temperatures ranging from 20 to 170° C. preferably 160° C. and high force conditions ranging from 45 to 100 kN/cm, preferably 55 kN/cm and Flack thickness between 9 mm to 33 mm.

According to some embodiments, the desired size of the granules is between 1-6 mm, most preferably between 1.4-4.75 mm.

According to some demonstrative embodiments, the present invention allows for the effective compaction of Polyhalite which is difficult to compact under regular conditions due to the difficulty in achieving deformation of Polyhalite particles.

According to some embodiments the addition of Potash, Phosphate compounds or the like to Polyhalite and the unique conditions described herein enable to overcome the difficulties of compacting Polyhalite and to effectively provide compacted granules of with addition of phosphate compounds, Potassium Nitrate or Potassium Sulfate According to some demonstrative embodiments Potassium Nitrate will be added to Polyhalite and the unique conditions described herein enable to overcome the difficulties of compacting Polyhalite and to effectively provide compacted granules of Polyhalite, optionally with additional compounds like Potash, phosphate compounds or potassium Nitrate or Potassium Sulfate optionally with the addition of a binder. According to some embodiments, the process may include wet compaction, wherein the process is carried out in a temperature ranging from room 5 temperature (~20° C.) to 100° C.

According to these embodiments, in wet compaction the process includes the following steps:

Mixing Polyhalite, optionally with a binder or binders suspension, solid or solution at room temperature;

Feeding the mixture into a compactor to provide wet compacted flakes;

Grinding of the flakes;

Sieving of the grinded flakes; and

According to some embodiments, after sieving there are three types of yield:

1. Desired sized flakes—from 9 to 33 mm thickness, S.G. between 1.9 to 2.8 g/cm3
2. Oversized (OS) flakes—are returned to the grinding stage, e.g., between 20-40% of the yield.
3. Undersized (US) flakes—are returned to the mixture for compaction According to these embodiments, the wet compaction process includes heating the desired size granules to evaporate any water residues from the granules, resulting in dry granules. According to some embodiments, the granules are heated to a temperature of between 100-160° C., preferably 160° C.

According to some embodiments, the binder suspension may include a binder which is immersed in water, wherein the binder in the wet process is preferably fly ash, calcium oxide and/or calcium hydroxide.

According to some embodiments, to the resulting flakes additives may be added, including for examples, nutrients, minerals, coating materials, sustained release compounds and the like.

According to some embodiments, the nutrients may include:

Nitrogen (N): leaf growth;

Phosphorus (P): Development of roots, flowers, seeds, fruit;

Potassium (K): Strong stem growth, movement of water in plants, promotion of flowering and fruiting;

three secondary macronutrients: calcium (Ca), magnesium (Mg), and sulphur (S); micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

According to some embodiments, the mixture of the present invention may also include additional fertilizer besides Polyhalite.

According to some demonstrative embodiments, the term "fertilizer" may include any material of natural or synthetic origin that is applied to soils or to plant tissues to supply one or more plant nutrients essential to the growth of plants, including, for example, Single nutrient ("straight") fertilizers such as Ammonium nitrate, Urea, calcium ammonium nitrate, superphosphate, e.g., "Single superphosphate" (SSP), phosphogypsum, Triple superphosphate (TSP) or a mixture thereof; Multinutrient fertilizers such as Binary (NP, NK, PK) fertilizers, e.g., monoammonium phosphate (MAP) and/or diammonium phosphate (DAP), NPK fertilizers which are three-component fertilizers providing nitrogen, phosphorus, and potassium; fertilizers which include one or more of the main micronutrients sources of iron, manganese, boron, molybdenum, zinc, and copper and the like; Compound fertilizers, e.g., which contain N, P, and K; Organic fertilizers such as peat, animal wastes, plant wastes from agriculture, and sewage sludge; and/or Other elements such as calcium, magnesium, and sulfur.

According to some embodiments, the fertilizer preferably includes one or more of nitrogen fertilizers such as ammonia, anhydrous ammonium nitrate, urea and sodium nitrate; Phosphate fertilizers; Potassium fertilizers, such as Potash, potassium chloride, potassium sulfate, potassium carbonate, or potassium nitrate According to some embodiments, the fertilizer is preferably Ammonium Sulphate.

According to some demonstrative embodiments, the sieving is done using a siever having opening with a diameter of between 1.4-4.5 mm preferably between 2-4 mm, most preferably 3.4 mm.

According to some embodiments, the mixing is performed in a blade blender and/or any other suitable devise capable of having a rotation speed that creates a swirling motion for a perfect homogenization and a high blending precision, e.g., a Ploughshare® Mixer.

According to some embodiments, the resulting flakes/granules may be glazed and further coated with a suitable coating. For example, the coatings may include biodegradable coatings, sustained release coatings, controlled release coatings, oily coatings, wax coatings.

The resulting Polyhalite may include the following properties as detailed in table 1

TABLE 1

| Chemical Properties | Concentration |
|---|---|
| Sulphur ($SO_3$) | 48%. |
| Potassium ($K_2O$) | 14% |
| Magnesium (MgO) | 6% |
| Calcium (CaO) | 17% |
| $H_2O$ | 0.1% |

TABLE 2

| Physical properties | |
|---|---|
| Bulk Density | 1.34 T/m³ |

According to some demonstrative embodiments, there is provided herein a process for the compaction of Polyhalite, comprising: mixing a feed of polyhalite with an inorganic binder in a mixer to yield a mixture; compacting said mixture in a compactor to yield masses; crushing said masses in a crusher to yield particles; and screening said particles in a screener to yield particles in three different sizes: oversized fine particles which undergo a second crushing process and are retuned to said screener for screening, undersized fine particles which are transferred to said mixer for further mixing and compacting, and desired size fine particles which are transferred to a polish screener for glazing and oiling.

According to some embodiments, the process may be a wet process including the addition of a binder.

According to some embodiments, the binder may be added to the mixer with the feed of polyhalite.

According to some embodiments, the binder may be selected from the group including, bentonite, sodium silicate, lignosulfonates, hydrated lime, bitumen, Portland cement, clay, acids (nitric, hydrochloric, phosphoric, sulphuric), water, water glass, cements, Fly Ash, Potassium and Sodium Silicate, MgO, CaO, Geo-polymers, and the like, or a combination thereof.

According to some embodiments, the binder may be 2% CaO+5% $Na_2SiO_3$.

According to some embodiments, the binder may be Mg Lignosulfonate, for example, in a concentration of between 2%-5%.

According to some embodiments, the process may be a dry process wherein said mixture is heated in a heater after being mixed in said mixer.

According to some embodiments, the process may include adding an organic binder to the inorganic binder to create a mixture of organic-inorganic binder.

According to some demonstrative embodiments, there is provided herein a compacted granule of Polyhalite, comprising an inorganic binder.

According to some embodiments the granule comprises a thickness of 9 to 33 mm and a specific gravity (S.G.) of between 1.9 to 2.8 g/cm³.

According to some embodiments, the granule is between 1-6 mm, most preferably between 1.4-4.75 mm.

According to some embodiments, the granule comprises a single strength of between 0.8 kgForce/granule to 3.5 kgForce/granule, preferably between 0.9 kgForce/granule to 3.3 kgForce/granule, most preferably between 1.9 kgForce/granule to 2.0 kgForce/granule.

According to some embodiments, the binder may be selected from the group including, bentonite, sodium silicate, lignosulfonates, hydrated lime, bitumen, Portland cement, clay, acids (nitric, hydrochloric, phosphoric, sulphuric), water, water glass, cements, Fly Ash, Potassium and Sodium Silicate, MgO, CaO, Geo-polymers, and the like, or a combination thereof.

According to some embodiments, the binder may be 2% CaO+5% $Na_2SiO_3$.

According to some embodiments, the binder may be Mg Lignosulfonate, for example, in a concentration of between 2%-5%.

According to some embodiments, the binder may further an organic binder, added to the inorganic binder to create a mixture of organic-inorganic binder.

Figure 1:
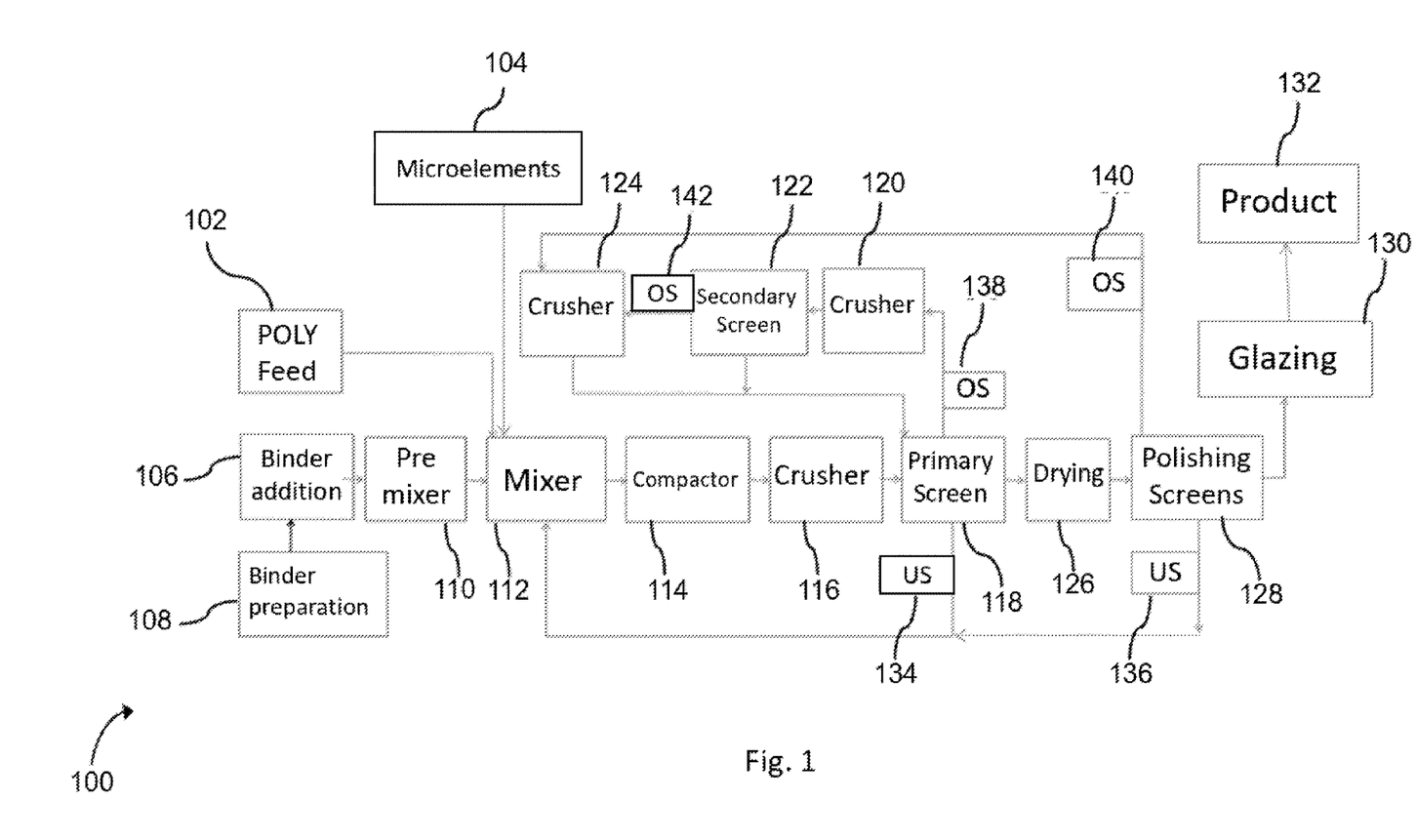
FIG. 1 depicts a wet process for the compaction of polyhalite in accordance with the invention.

Reference is now made to FIG. 1 which depicts a wet process 1 for the compaction of Polyhalite in accordance with some demonstrative embodiments described herein.

As shown in FIG. 1, wet process 100 may include a binder preparation step 108.

According to some embodiments, preparation step 108 can include the following steps: binder heating, mixing, grinding, activation, dissolution and curing, Step 106 depicts the addition of the binder to a pre-mixer 110, in which the pre-mixer 110 saves the homogenous composition of the binder mixture.

According to some embodiments, the binder is then added to a mixer 112 to which a feed of Polyhalite 102 is optionally added together with microelements 104. According to some embodiments, in mixer 112 the Polyhalite, microelements and binder are homogenously mixed together to create a Polyhalite wet mixture ("the mixture").

According to some embodiments, the mixture may then be transferred to a compactor 114 to undergo compaction. The compactor may work in the follow conditions: high or low temperatures ranging from 20 to 100° C. and high force conditions ranging from 45 to 100 kN/cm, preferable 55 kN/cm and Flack thickness between 9 mm to 33 mm.

According to some embodiments, the mixture leaves compactor 114 as compacted masses which are then transferred to a crusher 116, and the masses are then crushed to finer particles in a size ranging from 0.1 mm to 33 mm.

According to some embodiments, the particles may undergo primary screening in a screener 118 with multiple decks between 1 mm to 6 mm, preferably 1.44 to 4.75 mm.

According to some demonstrative embodiments, from screener 118 there may be yielded particles in 3 different size ranges:
1. Oversized particles 138 (also referred to herein as "OS") having a size diameter of more than 6 mm.
2. Undersized particles 134 (Also referred to herein as "US") having a size diameter between of below 1 mm.
3. Desired sized particles having a size diameter of between 1 to 6 mm According to some embodiments undersized particles 134 and/or any dust that may be formed while passing through screener 118 can be separately granulated and/or introduced back to the process, e.g., to mixer 112 to be mixed again with the mixture. The range of the undersized particles 134 and/or any dust that may be formed while passing through screener 118 can be between 0.1 to 1 mm.

Oversized particles 138 may go at least one crushing procedure to be crushed to a desired size.

For example, OS 138 may be transferred to crusher 120 and undergo a secondary screening in screener 122. Any particles having a desired size ranging between 0.1 mm to 6 mm that may result from screener 122 may be added back to screener 118.

Oversized particles 142 that result from screener 122 may undergo additional crushing in crusher 124, wherein particles yielded from crusher 124 are added back to screener 118 for further processing.

According to some embodiments, the differences between crusher 120 and 124 may be hammer mill or other kind of crushers.

According to some embodiments, the desired sized particles leaving screener 118 may go through a process of drying to drying any residual moisture from the particles and to yield dry particles.

The dry particles are then transferred to a polishing screener 128 to undergo an additional, finer, screening process 1 mm to 6 mm preferably 1.4 mm to 4.75 mm. According to some demonstrative embodiments, from polishing screener 128 there may be yielded particles in 3 different size ranges:
1. Oversized particles 140 (also referred to herein as "OS") having a size diameter over 6 mm;
2. Undersized particles 136 (Also referred to herein as "US") having a size diameter under 1 mm;
3. Final particles having a size diameter of 1 to 6 mm, preferably 1.4-4.75 mm.

According to some demonstrative embodiments the undersized particles 136 may be transferred back to mixer 112 to be mixed again with the mixture.

Oversized particles 140 may go through a crushing procedure to be crushed to a desired size.

For example, OS 140 may undergo crushing in crusher 124, wherein particles yielded from crusher 124 are added back to screener 118 for further processing.

According to some embodiments, the final particles yielded from polishing screener 128 may go through a process of glazing in glazer 130.

According to some embodiments, the grazing system may prevent the abrasion and dust pollution during the transport. Glazer 130 may include a rotary drum, a drying can, various types of dryers, e.g., fluid bed dryer, or others The yield from glazer 130 is to be packaged as the final product 132.

Figure 2:
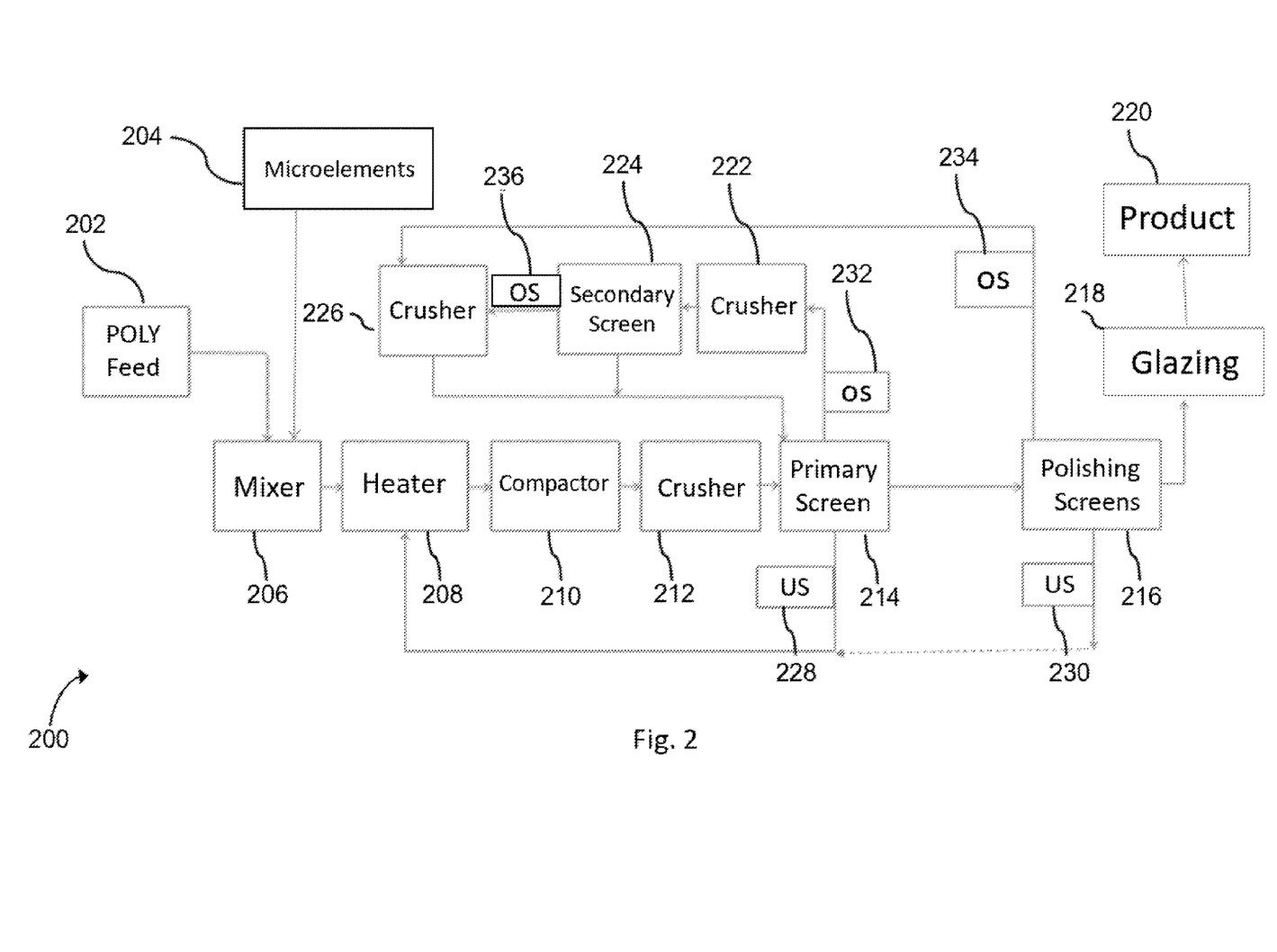
FIG. 2 depicts a dry process for the compaction of polyhalite.

Reference is now made to FIG. 2 which depicts a dry process 2 for the compaction of Polyhalite.

As shown in FIG. 2, dry process 200 may include a feed of Polyhalite 202 which is optionally added together with a feed of microelements 204 to a mixer 206.

According to some embodiments, in mixer 206 the Polyhalite are homogenously mixed together to create a Polyhalite/additives dry mixture ("the dry mixture").

According to some embodiments, the dry mixture may then be transferred to a Heater 208 to heat the material to compacting process between 100 to 170 degrees, preferably 160 degrees.

According to some embodiments, the heated dry mixture may then be transferred to a compactor 210 to undergo compaction and yield compacted masses. According to some embodiments, the compaction parameters may include high temperatures ranging from 20 to 170° C. preferably 160° C. and high force conditions ranging from 45 to 100 kN/cm, preferable 55 kN/cm and Flack thickness between 14 mm to 37 mm.

According to some embodiments, the compacted masses are then transferred to a crusher 212, and the masses are then crushed to finer particles.

According to some embodiments, the particles may undergo primary screening in a screener 214 with multiple decks between 1 mm to 6 mm, preferable 1.4-4.75.

According to some demonstrative embodiments, from screener 214 there may be yielded particles in 3 different size ranges:
1. Oversized particles 232 (also referred to herein as "OS") having a size diameter of having a size diameter of more than 6 mm.
2. Undersized particles 228 (Also referred to herein as "US") having a size diameter of less than 1 mm.
3. Desired sized particles having a size diameter between 1 to 6 mm.

According to some embodiments undersized particles 228 and/or any dust that may be formed while passing through screener 214 can be separately granulated and/or introduced back to the process, e.g., to mixer 206 or heater 208. The range of the undersized particles 228 and/or any dust that may be formed while passing through screener 214 can be between 0.1 to 1 mm.

According to some demonstrative embodiments the undersized particles 228 may be transferred back to heater 208.

Oversized particles 232 may go at least one crushing procedure to be crushed to a desired size.

For example, OS 232 may be transferred to crusher 222 and undergo a secondary screening in screener 224. Any particles having a desired size ranging between 1 to 6 mm preferable 1.4 mm to 4.7 mm that may result from screener 224 may be added back to screener 214. Oversized particles 236 that result from screener 224 may undergo additional crushing in crusher 226, wherein particles yielded from crusher 226 are added back to screener 214 for further processing.

According to some embodiments, the differences between crusher 222 and 226 may be the kind of crusher and operational parameters.

According to some embodiments, the desired sized particles leaving screener 214 may go through a polishing screener 216 to undergo an additional, finer, screening process. 1 to 6 mm preferable 1.4 mm to 4.7 mm.

According to some demonstrative embodiments, from polishing screener 216 there may be yielded particles in 3 different size ranges:
1. Oversized particles 234 (also referred to herein as "OS") having a size diameter higher than 6 mm.
2. Undersized particles 230 (Also referred to herein as "US") having a size diameter lower than 1 mm.
3. Final particles having a size diameter of 1-6 mm, preferably between 1.4-4.7 mm.

According to some demonstrative embodiments the undersized particles 230 may be transferred back to heater 208.

Oversized particles 234 may go through a crushing procedure to be crushed to a desired size.

For example, OS 234 may undergo crushing in crusher 226, wherein particles yielded from crusher 226 are added back to screener 214 for further processing.

According to some embodiments, the final particles yielded from polishing screener 216 may go through a process of glazing in glazer 218. According to some embodiments, the glazing system may prevent the abrasion and dust pollution during the transport. Glazer 218 may include a rotary drum, and dryer, can be used various types of dryers, e.g., fluid bed dryer, rotary dryer or others The yield from glazer 218 is to be packaged as the final product 220.

EXAMPLES

Example-1

The following conditions were set:

| Feeding material | 1. Polyhalite standard grade |  |
| Binder | 2. 2%CaO + 5% Na$_2$SiO$_3$ |  |

| Equipment | Units | Value/Description |
|---|---|---|
| Feed Temp | ° C. | 160-170 |
| Feed Rate | ton/h | 40 |
| Motor power | kW | 710 |
| Roll Width | mm | 800 |
| Roll speed | [RPM] | 18 |
| Linear speed | [m/s] | 0.94 |
| Roll Diameter | [cm] | 1000 |
| Flake specific weight | g/cm3 | >2.263 |
| Pressure Ratio |  | 0.9 |
| Off load Gap | [mm] | 16 |
| Working Gap | [mm] | 20 |
| Force | [kN/cm] | 44 |
| Specific force | [kN/(cm · mm)] | 2.6-3.1 |
| Screw Speed | rpm | 93-96 |
| Recycle Ratio |  | High (preferably estimated based on the flakes' size) |
| 1$^{st}$ Crusher Speed | rpm | 473-1500 |
| 2$^{st}$ Crusher Speed | rpm | 473-1599 |
| Dust trap system |  | Filter/cyclon |

Specification of the Resulting Product

| Granulometry | 1.4-4.7 mm |
| % H$_2$O | 0.1% |
| Single Strength | 2 kg Force/granule |
| Dust after abrasion (%) | 4 |

Example-2

The following conditions were set:

| Feeding material | 1. Polyhalite standard grade |  |
| Binder | 2. 2%CaO + 5% Na$_2$SiO$_3$ |  |

| Equipment | Units | Value/Description |
|---|---|---|
| Feed Temp | ° C. | 160-170 |
| Motor power | kW | 710 |
| Roll Width | mm | 14 |
| Roll speed | [RPM] | 6 |
| Roll Diameter | [cm] | 600 |
| Flake specific weight | g/cm3 | >2.263 |
| Off load Gap | [mm] | 2 |
| Working Gap | [mm] | 14 |
| Force | [kN/cm] | 55-60 |
| Specific force | [kN/(cm · mm)] | 2.6-3.1 |
| Recycle Ratio | % | 60 |
| 1$_{st}$ Crusher Speed | rpm | 1000 |
| 2$_{st}$ Crusher Speed | rpm | 700 |

Specification of the Resulting Product

| Granulometry | 1.4-4.7 mm |
| % H$_2$O | 0.1% |
| Single Strength | 2 kgForce/granule |
| Dust after abrasion (%) | 4 |

Example-3

| Feeding material | 1. Polyhalite standard grade |  |
| Binder | 2. Mg Lignosulfonate 5% |  |
|  | 3. Water 1% |  |

| Equipment | Units | Value/Description |
|---|---|---|
| Feed Temp | ° C. | 12-19 |
| Motor power | kW | 710 |
| Roll Width | mm | 14 |
| Roll speed | [RPM] | 6 |
| Roll Diameter | [cm] | 600 |
| Flake specific weight | g/cm3 | >2.263 |
| Off load Gap | [mm] | 2 |
| Working Gap | [mm] | 14 |
| Force | [kN/cm] | 55-60 |
| Specific force | [kN/(cm · mm)] | 2.6-3.1 |
| Recycle Ratio | % | 80 |
| 1$_{st}$ Crusher Speed | rpm | 1000 |
| 2$_{st}$ Crusher Speed | rpm | 700 |

-continued

| | |
|---|---|
| Granulometry | 1.4-4.7 mm |
| Single Strength | 1.9 kgForce/granule |
| Dust after abrasion (%) | 19.9 |

Example-4

| | | |
|---|---|---|
| Feeding material | 1. Polyhalite standard grade | |
| Binder | 2. Liquid + Solid Na Lignosulfonate 2% | |
| | 3. Water 1.5% | |
| Equipment | Units | Value/Description |
| Feed Temp | ° C. | 12-19 |
| Feed Rate | ton/h | 15 |
| Flake specific weight | g/cm3 | >2.263 |
| Working Gap | [mm] | 11 |
| Specific force | [kN/(cm · mm)] | 2.6-3.1 |
| Granulometry | 1.4-4.7 mm | |
| % H$_2$O | 1-0.8% | |
| Single Strength | 0.9 kgForce/granule | |
| Single Strength after drying | 3.3 kgForce/granule | |

While this invention has been described in terms of some specific examples, many modifications and variations are possible. It is therefore understood that within the scope of the appended claims, the invention may be realized otherwise than as specifically described.

The invention claimed is:

1. A process for the compaction of Polyhalite, comprising:
    mixing a feed of polyhalite with an inorganic binder suspension or solution in a mixer to yield a mixture;
    compacting said mixture in a compactor to yield masses;
    crushing said masses in a crusher to yield particles; and
    screening said particles in a screener to yield particles in three different sizes:
        oversized fine particles which undergo a second crushing process and are retuned to said screener for screening,
        undersized fine particles which are transferred to said mixer for further mixing and compacting, and
        desired size fine particles between 1-6 mm, which are transferred to a polish screener for glazing and oiling,
    wherein said process is a wet process and said granule is comprised of said Polyhalite, said binder and water.

2. The process of claim 1, wherein said binder is selected from the group consisting of bentonite, sodium silicate, lignosulfonates, hydrated lime, bitumen, Portland cement, clay, nitric acid, hydrochloric acid, phosphoric acid, sulphuric acid, water, water glass, cements, Fly Ash, Potassium and Sodium Silicate, MgO, CaO, Geo-polymers or a combination thereof.

3. The process of claim 2, wherein said binder is 2% CaO+5% Na$_2$SiO$_3$.

4. The process of claim 2, wherein said binder is Mg Lignosulfonate.

5. The process of claim 1, further comprising drying at 150 degrees Celsius.

6. The process of claim 5, wherein said binder is added to the mixer with said feed of polyhalite.

7. The process of claim 1 wherein said process is a dry process wherein said mixture is heated in a heater after being mixed in said mixer.

8. The process of claim 1, further comprising adding an organic binder to the inorganic binder to create a mixture of organic-inorganic binder.

9. A compacted granule of Polyhalite, comprising an inorganic binder, wherein said granule comprises a thickness of 9 to 33 mm and a specific gravity (S.G.) of between 1.9 to 2.8 g/cm$^3$, a size of 1.4-4.75 mm and a single strength of between 0.9 kgForce/granule to 3.3 kgForce/granule.

10. The granule of claim 9, wherein said binder is selected from the group consisting of bentonite, sodium silicate, lignosulfonates, hydrated lime, bitumen, Portland cement, clay, nitric acid, hydrochloric acid, phosphoric acid, sulphuric acid, water, water glass, cements, Fly Ash, Potassium and Sodium Silicate, MgO, CaO, Geo-polymers or a combination thereof.

11. The granule of claim 10, wherein said binder is 2% CaO+5% Na$_2$SiO$_3$.

12. The granule of claim 10, wherein said binder is Mg Lignosulfonate, in a concentration of between 2%-5%.

13. The granule of claim 10, wherein said binder further comprises an organic binder, added to the inorganic binder to create a mixture of organic-inorganic binder.

* * * * *